Jan. 9, 1962      E. M. TUCKER, SR      3,016,270
TRACTOR WHEEL WITH ADJUSTABLE GROUSERS

Filed Aug. 29, 1960      3 Sheets-Sheet 1

INVENTOR
*Emmitt M. Tucker, Sr.*

BY *Webster & Webster*
ATTORNEYS

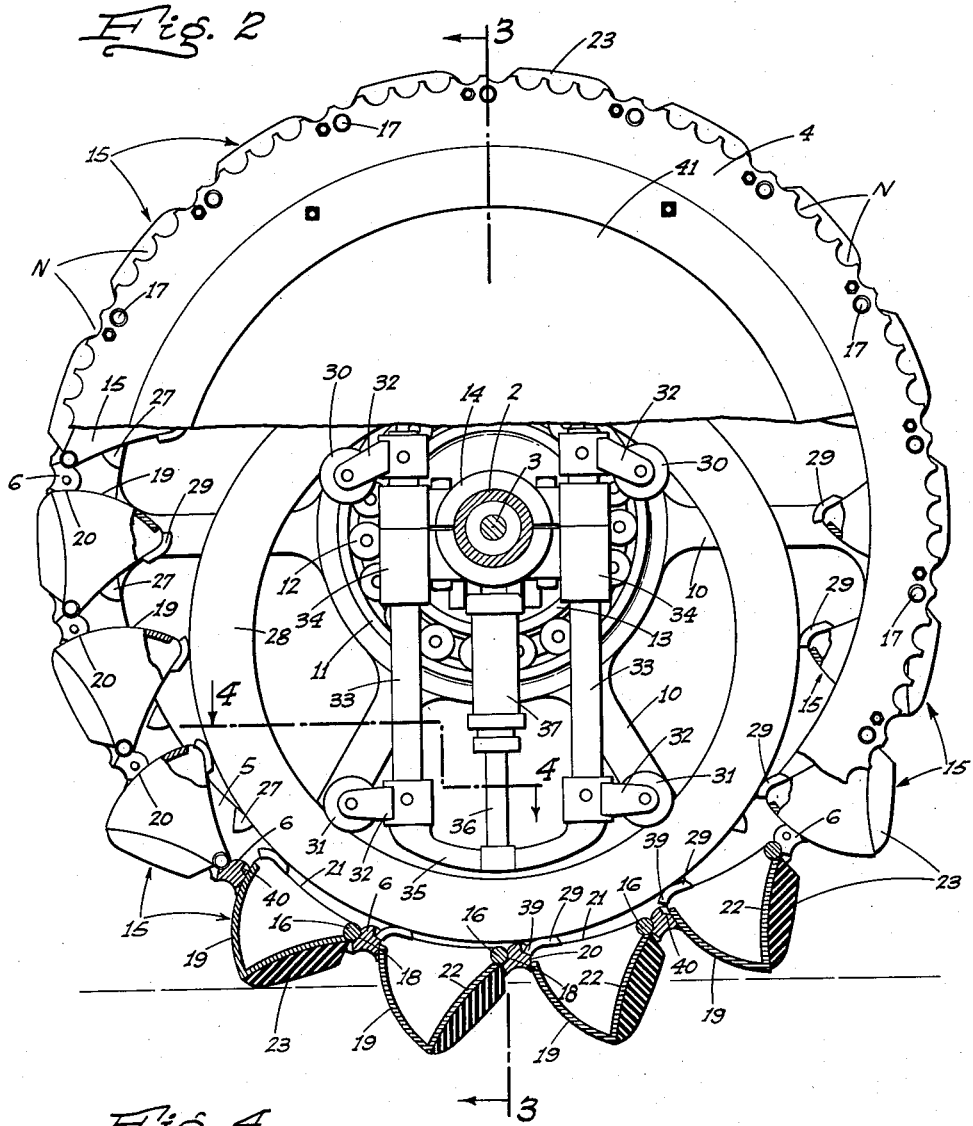
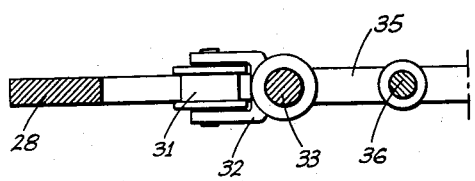

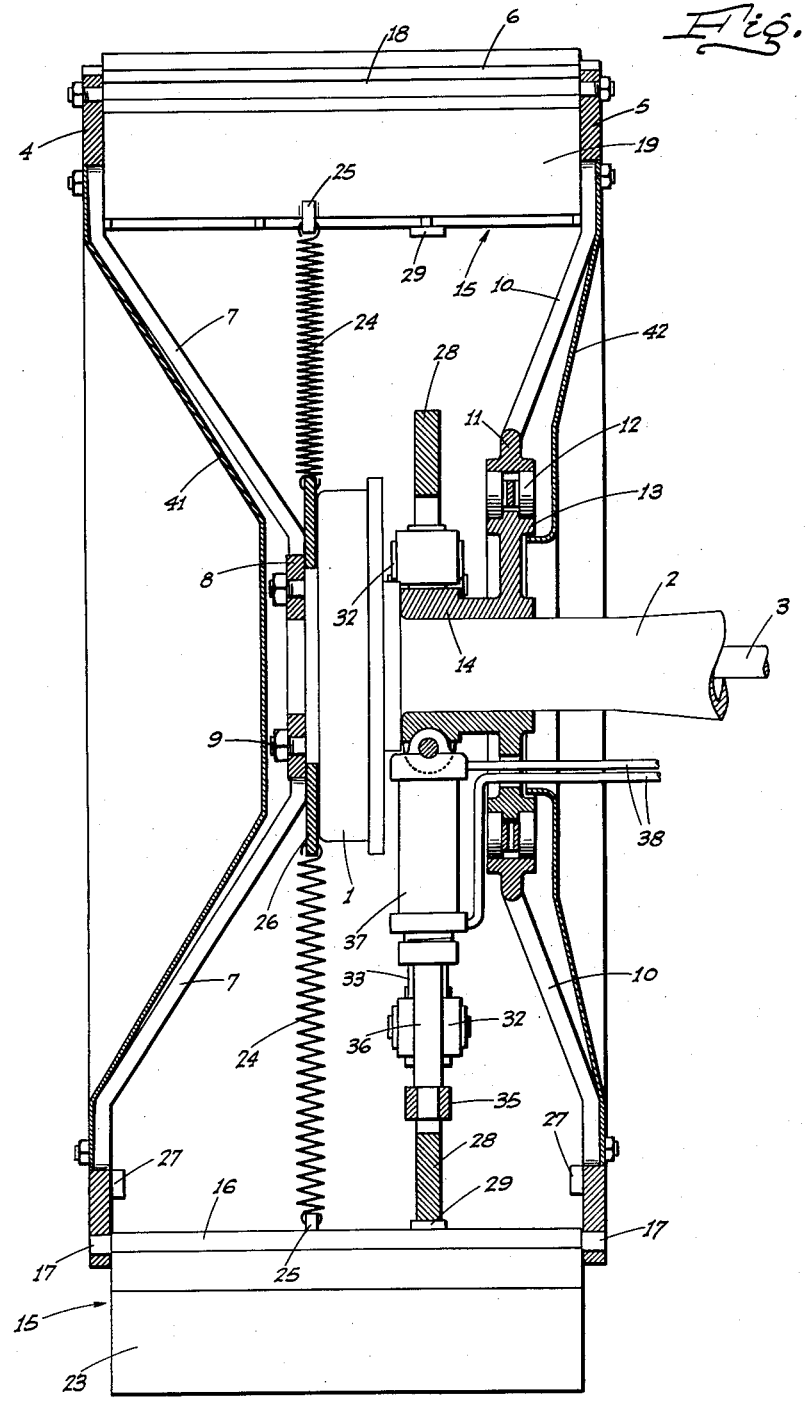

United States Patent Office 3,016,270
Patented Jan. 9, 1962

3,016,270
TRACTOR WHEEL WITH ADJUSTABLE
GROUSERS
Emmitt M. Tucker, Sr., Medford, Oreg., assignor to
Tucker & Sons, Grass Valley, Calif., a corporation of
California
Filed Aug. 29, 1960, Ser. No. 52,639
2 Claims. (Cl. 301—43)

This invention relates to tractor wheels and particularly to one adapted to be driven.

Such wheels, if not rubber-tired, are provided with rigid traction-increasing grousers which—if driven over a hard surface road—cut into the same and are usually barred by law from traveling over such roads unless the grousers are blocked out or otherwise rendered ineffective. Such an operation consumes considerable time, and is thus avoided whenever possible.

It is therefore the major object of my invention to provide a grousered wheel so constructed that the grousers are mounted so that they may be advanced or projected from the periphery of the wheel whenever desired. At the same time, the grousers—when retracted from the tread portion of the wheel—cannot possibly damage any surface with which they come in contact.

A further object of the invention is to provide means, mounted in connection with the wheel, and under the control of the operator of the tractor, for thus projecting the grousers of the wheel as they move to the bottom position of the wheel as the latter rotates.

Another object of the invention is to provide a grouser actuating and control means so constructed and arranged that the grousers may be advanced to different extents as the operator may desire, and which will function with equal effectiveness irrespective of the direction of rotation of the wheel.

It is also an object of the invention to provide a tractor wheel with adjustable grousers which is designed for ease and economy of manufacture.

Still another object of the invention is to provide a practical, reliable, and durable tractor wheel with adjustable grousers, and one which will be exceedingly effective for the purpose for which it is designed.

These objects are accomplished by means of such structure and relative arrangement of parts as will fully appear by a perusal of the following specification and claims.

In the drawings:

FIG. 2 is a similar view showing the grousers advanced.

FIG. 3 is a transverse section of the wheel somewhat enlarged, and taken substantially on line 3—3 of FIG. 2.

FIG. 4 is a fragmentary enlarged sectional plan on line 4—4 of FIG. 2.

Figure 1:
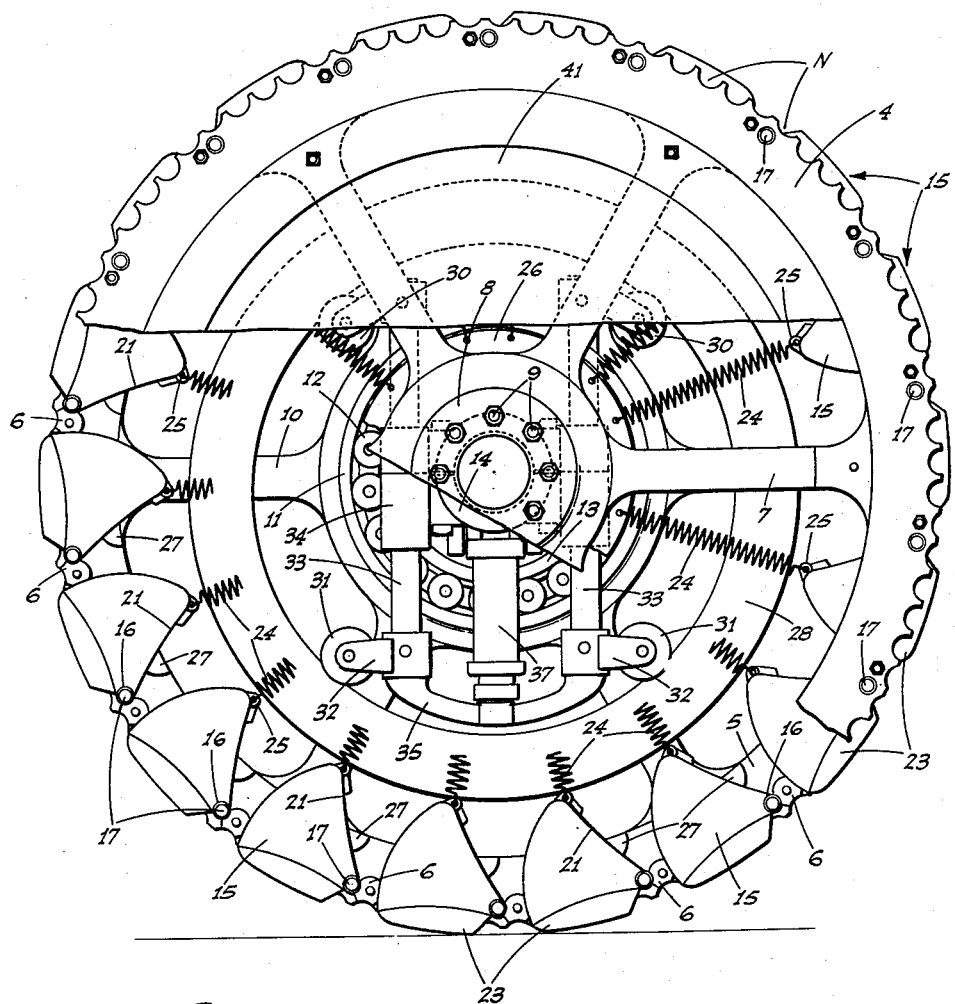
FIG. 1 is a side elevation of the wheel partly broken out, showing the grousers retracted.
Figure 5:
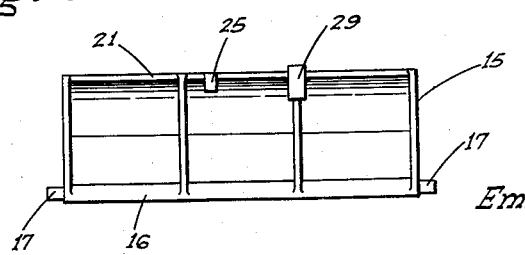
FIG. 5 is a plan view of one of the grousers, detached.

Referring now more particularly to the drawings, and to the characters of reference marked thereon, the wheel of the present invention is designed to be mounted, in place of the conventional wheel, on the driven brake housing and hub member 1 which is disposed on the laterally outer end of the fixed axle housing 2 in which the hub supporting and driving shaft 3 is mounted; such a structure being conventional on various wheel-type tractors.

The wheel includes a rim unit which comprises a pair of transversely spaced and parallel rim forming rings 4 and 5 disposed in laterally outer and inner relationship, respectively. The rim rings are rigidly connected at evenly spaced intervals by cross bars 6. Ring 4 is connected to or formed with spokes 7 which extend radially inward to connection with a hub plate 8. This plate is connected to the laterally outer face of housing 1 by means of studs or bolts 9. The ring 5 is likewise connected to or formed with spokes 10 which extend radially inward to connection with a hub band 11. This band forms the outer race for anti-friction bearing rollers 12; the inner race 13 for such rollers being formed on or rigid with a split body 14 clamped onto the housing 2 directly back from housing 1. The spokes 7 and 10 diverge relative to each other from their respective hub members so that the wheel at the rim is relatively wide. The bore of hub band 11 is preferably slightly greater than the diameter of housing 1, so that the wheel may be mounted in position without having to first dismantle and remove the housing 1.

Disposed in the spaces between the various bars 6 and extending the full width between the rim rings 4 and 5 are combination grousers and tread forming members, indicated generally at 15. Each grouser, which is hollow for lightness, comprises a circular shaft-like cross member 16 at one end thereof; said member having end trunnions 17 turnably supported in the rim bands 4 and 5, as particularly shown in FIG. 3. The cross member 16 engages a seat 18 in the adjacent side of the adjacent cross bar 6, so as to form a mud seal therewith.

The outer face 19 of the grouser at the end thereof opposite the member 16 is concentric with said member and engages a seat 20 formed in the adjacent side of the adjacent cross bar 6, thereby also providing a mud seal.

The face 19 is of considerably greater extent than the cross member, so that the radially inner and outer edges of faces 21 and 22 of the grouser diverge from said member to the ends of face 19. The body of each grouser is of metal, but a thickness of tread forming rubber 23 is preferably secured onto the outer face of the grouser and forms a part thereof.

A tension spring 24 connects an ear 25 on each grouser intermediate its side edges and a floating disc 26 mounted between the hub plate 8 and the housing 1, as shown in FIG. 3. The ear is mounted on the grouser at the end thereof farthest from the cross member 16 so that the spring exerts the most effective pull on the grouser to swing the same radially inward about the member 16 as an axis. Such movement is limited by stops 27 secured on the rim members 4 and 5 and projecting into the path of movement of the grouser. When the grouser is thus stopped the periphery of the rubber tread 23 is radially out from the periphery of the members 4 and 5 a short distance, and is curved so as to be then concentric with the periphery of said members 4 and 5. The tread portions of adjacent grousers are of course separated by the cross bars 6, which are disposed inwardly of the periphery of the rim members 4 and 5, but otherwise said grousers provide a substantially continuous surface which will not cut into or otherwise harm the road, while giving good traction. Such traction is increased, in soft ground, by the fact that the peripheral edge of the rim bands 4 and 5 are notched throughout their extent, as shown at N.

The grousers adjacent the bottom of the wheel may be swung downwardly to an actual grouser forming and traction increasing position as the wheel rotates, by means of the following structure:

A floating circular cam ring 28 surrounds the axle housing 2 and the body 14 clamped thereon at a suitable lateral point between housing 1 and the hub and bearing band 11. The outer periphery of the ring 28 is in line laterally of the wheel with wear strips or lugs 29 secured on the grousers and projecting radially inward from their inner edges 21 at the end thereof farthest from the pivot members 16, as clearly shown in FIG. 2.

The inner periphery of the cam ring 28 is held against lateral movement, while being free to rotate, by means of upper and lower pairs of circumferentially spaced flanged rollers 30 and 31, respectively. The bearing brackets 32 for all such rollers are mounted on the ends of, and are rigid with, vertical rods 33, which are guided for longitudinal movement in sleeves 34 formed with the body 14 on opposite sides of the housing 2.

The lower bearing brackets 32 are connected by a rigid cross bar 35 which is engaged by the piston rod 36 of a hydraulic two-way ram 37 depending from, and supported by, the body 14. The flow control pipes 38 for the ram project laterally inward from the wheel at a point above the fixed bearing race 13, as shown in FIG. 3, from which point the pipes extend to a suitable control valve (not shown) positioned for convenient operation by the operator of the tractor.

The hydraulic ram is arranged so that when the piston rod is fully retracted the cam ring 28 will be held up by the upper rollers 30 in order that the outer periphery thereof will clear the lugs 29 of all the grousers when the latter are in their spring-urged retracted position, as shown in FIG. 1.

Upon fluid being forced into the top of the ram cylinder, the lower rollers 31 force the cam ring down so that the lower portion of its outer periphery moves into the path of—and engages, and is engaged by—the lugs 29 of the grousers in succesion as the wheel rotate. In this manner the lower grousers will be swung down about the cross members 16—or their trunnions 17—as an axis. The extent to which the grousers will be thus swung, and projected out from the periphery of the rim bands 4 and 5, will of course depend on the amount of advance of the piston rod, and which may be controlled by the operator. The cam ring 28, being rotatable irrespective of its position, friction is minimized as the lugs or strips 29 successively move into engagement with the cam ring.

On the trailing side of the cam ring and wheel the springs 24 function to restore the grousers to their normal retracted position as the cam ring moves away from the lugs 29. Since the cam ring 28 is circular and is mounted in the wheel symmetrical to the axis thereof, said wheel may rotate in either direction without affecting the grouser-advancing action.

Radially outward movement of the grousers is limited by suitable stop means, here shown as being the ends 39 of the lugs 29 which overhang and engage seats or shoulders 40 in the cross bars 6 when the grousers are fully advanced by the cam ring 28, as shown in FIG. 2.

In order to protect the moving parts of the mounting and control mechanism from dirt and dust, shield discs 41 and 42 are removably secured to and project radially inward from the bands 4 and 5, respectively; the shield 42 terminating short of the housing 2 and the point of projection of the pipes 38 so that no interference therewith is had, as shown in FIG. 3.

The grousers are mounted on the wheel in such relation to the normal direction of rotation thereof that when said grousers are advanced or projected, the push or load pressure is taken by the metal faces 19, and the rubber tread portions 23 are protected from excess wear.

Since the tread portions 23 of the wheel, when the grousers are retracted, are necessarily spaced apart somewhat, a certain bumping or vibratory action will be created as the wheel rotates, especially on a hard surfaced road. It may therefore be advisable to form the wheel as a dual unit, with the grousers on one portion of the unit offset circumferentially relative to the grousers on the other portion of such unit. By so doing, the gaps between the grouser treads of one portion of the wheel would be overlapped by the tread members on the other portion of the wheel, and the undesirable bumping action would be eliminated.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A grousered wheel for attachment to the driven hub projecting from the relatively stationary axle housing of a tractor, the wheel comprising a pair of transversely spaced rim rings, circumferentially spaced bars connecting the rings and maintaining them spaced, circumferentially extending grousers disposed between the rings and bars, means pivoting the grousers at one end on the rings, yieldable means normally holding the grousers retracted, the grousers each including radially outer and inner faces diverging from the pivoted end of the grouser and the outer face being substantially concentric with and adjacent the periphery of the rim rings when the grouser is retracted, cam-engaging wear members on the radially inner edge of the grousers adjacent the end thereof farthest from the pivot means, means connecting the laterally outer rim ring to the hub, a circular cam ring disposed in a vertical lateral plane back of the hub and intermediate the rim rings and surrounding the axle housing, upper and lower rollers engaging the inner periphery of the cam ring adjacent the top and bottom thereof respectively in planes on opposite sides of the axle housing, bearing brackets for the rollers, vertical rods on opposite sides of the axle housing connected to and rigid with the brackets, a body fixed on the axle housing, guide sleeves for the rods fixed on the body, a cross bar connecting the rods adjacent one end thereof, and a hydraulic ram extending between and connecting the cross bar and body.

2. A wheel structure, as in claim 1, with an antifriction bearing unit between the inner rim ring and the body adjacent the latter and including an inner bearing race, and a ram-actuating fluid conduit connected to the ram and extending laterally inward of the wheel and radially inward of said inner bearing race.

References Cited in the file of this patent

UNITED STATES PATENTS

| 781,573 | Todd | Jan. 31, 1905 |
| 1,003,500 | Plummer | Sept. 19, 1911 |
| 1,229,210 | Bartholomew | June 12, 1917 |
| 1,447,442 | Stone | Mar. 6, 1923 |
| 1,540,888 | Koenigsberger | June 9, 1925 |
| 2,094,425 | Cook | Sept. 28, 1937 |
| 2,193,149 | Ulrich | Mar. 12, 1940 |

FOREIGN PATENTS

| 201,937 | Germany | Sept. 22, 1908 |
| 490,891 | Canada | Mar. 3, 1953 |